United States Patent [19]

Blankemeyer

[11] 4,031,709

[45] June 28, 1977

[54] TILE DEGAPPER

[76] Inventor: John D. Blankemeyer, R.R. No. 3, Ottawa, Ohio 45875

[22] Filed: Feb. 19, 1976

[21] Appl. No.: 659,195

[52] U.S. Cl. .................. 61/106; 198/394; 198/395; 214/DIG. 3
[51] Int. Cl.² ............. B65G 11/00; F16L 1/00
[58] Field of Search ........... 61/72.5, 72.1, 72.6, 61/72.2, 72.3, 106; 198/257, 262, 268; 214/DIG. 3

[56] References Cited

UNITED STATES PATENTS

| 166,104 | 7/1975 | Hoffhein | 61/72.6 |
|---|---|---|---|
| 2,142,135 | 1/1939 | Lawton | 61/72.6 |
| 3,381,478 | 5/1968 | Wells | 61/72.5 |
| 3,421,609 | 1/1969 | Schmunk | 61/72.5 |

FOREIGN PATENTS OR APPLICATIONS 3,926  11/1941  Sweden ................ 61/72.5

Primary Examiner—Paul R. Gilliam
Assistant Examiner—Alex Grosz
Attorney, Agent, or Firm—Sughrue, Rothwell, Mion, Zinn & Macpeak

[57] ABSTRACT

Disclosed is an apparatus to detect misaligned clay tiles in the chute of a tile-laying machine and realign any tiles incorrectly aligned. The apparatus is capable of being retrofitted onto existing tile-laying machinery as well as being incorporated into improved future designs. The apparatus is comprised of alignment sensing switches which in turn control solenoid operated repositioning levers. The levers realign the ceramic tiles such that they are properly positioned to avoid gaps in the tile field.

6 Claims, 15 Drawing Figures

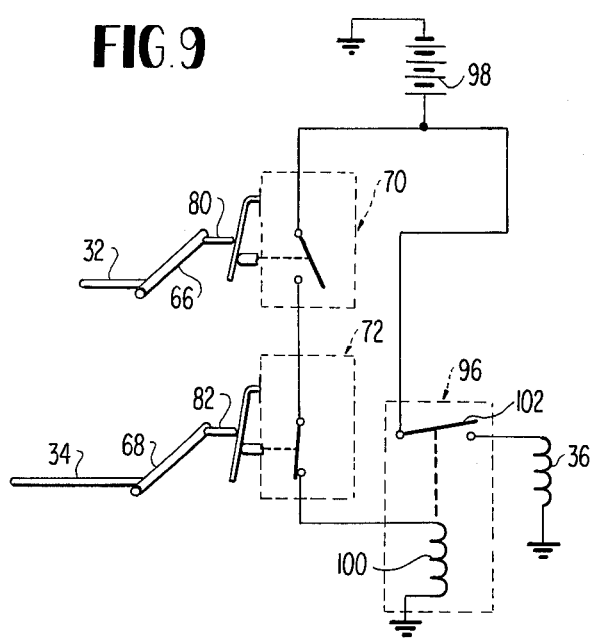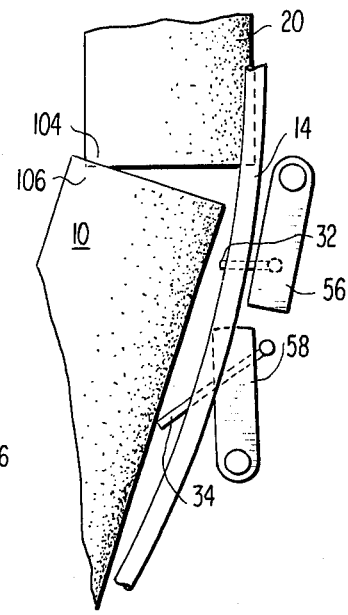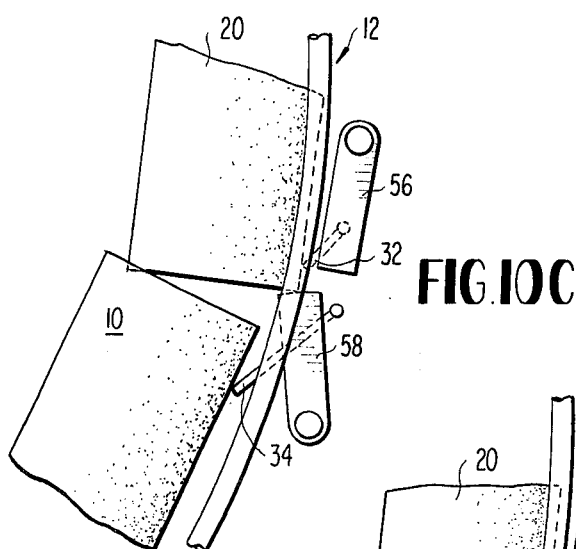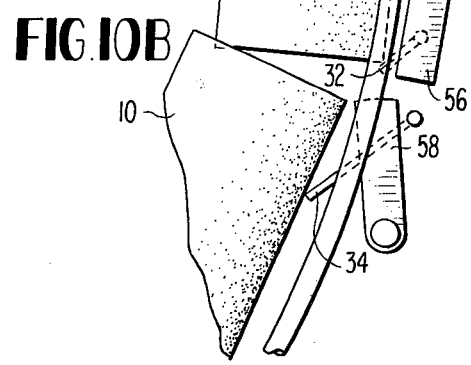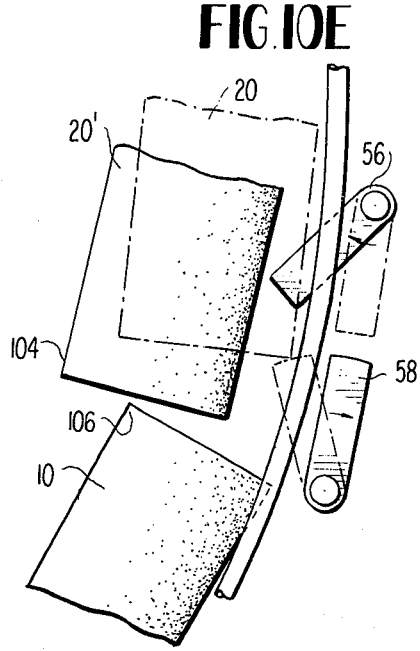

TILE DEGAPPER

BACKGROUND OF THE INVENTION

This invention relates generally to automated tile-laying apparatus and more particularly to the specific improvement in existing tile-laying machines of eliminating gaps between tiles as they are laid.

Porous clay tiles have long been used to draw excess water from a field or to dispense fluids to a field, for example, their use in septic tank drain lines where the liquid effluent from a septic tank is dispersed over a large ground area. To properly utilize the tiles, a trench up to several feet deep, is normally dug, lined with gravel and the cylindrical tiles are laid end to end such that a long porous pipe is formed. This is covered with a layer of gravel and then the trench is filled in. The fluid flows into the pipe which is essentially horizontal, stands and seeps through the porous sides of the pipe to be dispersed into the similarly porous ground. Early methods of constructing such a drain field required hand laying of the clay tiles which is long arduous back-breaking chore. Machinery has been developed to automatically the clay tiles in a closely connected end to end relationship to form the required porous pipe. However, occasionally the ceramic tile will jam up in the dispensing chute with the result that a substantial gap is formed between the end of the preceding cylinder and the beginning of the subsequent cylinder. These gaps if uncorrected would allow the pipe to be stopped up by dirt or allow the effluent in the operational pipe to train out through the gap rather than disperse slowly through the porous clay tile wall. This draining would allow a high concentration of effluent at one point in the ground resulting in seepage to the surface providing a health hazard or the possibility of erosion underground resulting in a collapse of the ground immediately above the gap. In the past, eliminating the gaps has been a manual operation necessitating either an additional operator on the machine to insure the clay tiles are correctly positioned in the dispensing chute or an operator following along behind the machine to slide the clay tiles into correct position. The ability to correct the tile positions in the chute would be highly desirous and would improve existing machinery and eliminate the necessity for extra personnel during the tile-laying operations.

SUMMARY OF THE INVENTION

It is therefore an object of the present invention to eliminate gaps which occur between clay tiles in an automatic dispensing chute.

It is a further object of the present invention to provide an inexpensive compact degapping apparatus to eliminate gaps occurring between clay tiles in an automatic tile-laying apparatus.

A still further object of the instant invention is to provide a degapping apparatus adaptable to be retrofitted to present tile-laying machinery.

In the present invention two sensing switches are placed in series, one of which is actuated by the presence of tiles coming down the dispensing chute and the other is actuated when a gap appears between two tiles. When both switches have been closed, an electrical solenoid is operated which actuates positioning levers where one releases the misaligned tile while the other urges into the correct alignment position. After the tile moves past the switches further along the dispensing chute, the switch which sensed the gap is opened and thus the solenoid is deactivated. The apparatus is constructed such that it can be mounted along any substantially vertical portion of the railed dispensing chute.

BRIEF DESCRIPTION OF THE DRAWINGS

FIG. 9 is a schematic view showing the electrical circuit interconnected with the mechanical sensing switches.

FIGS. 10A, B, C, D and E are side views showing the operation of the applicant's invention.

DESCRIPTION OF THE PREFERRED EMBODIMENTS

Figure 1:
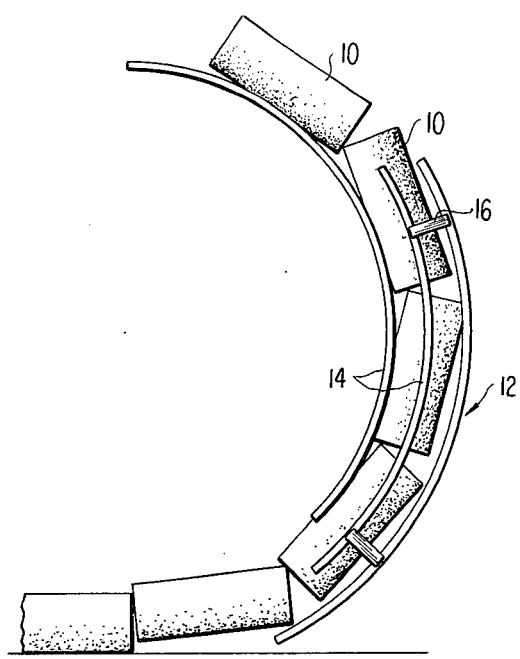
FIG. 1 is an operational side view of the normal tile-laying operations.
Figure 2:
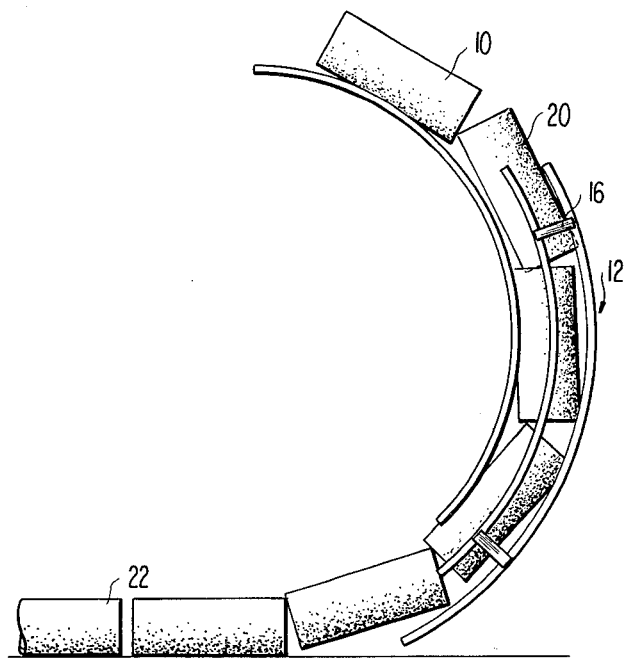
FIG. 2 is an operational side view of tile-laying operations showing incorrect positioning of tiles.

Referring now to the drawings wherein like reference numerals designate identical or corresponding parts through the several views, and more particularly to FIG. 1 wherein a typical automated clay tile-laying operation is depicted. Ceramic tiles 10 are fed into the top of the dispensing chute 12 made up of rails 14 and cross braces 16 such that each tile overlaps the end of the preceding tile. FIG. 2 illustrates the problem when one tile 20 is underlapped, that is, its front edge is actually under the trailing edge of the preceding tile. This misaligned tile when laid on the ground at the end of the dispensing chute will have a large gap 22 between it and the preceding tile.

Figure 3:
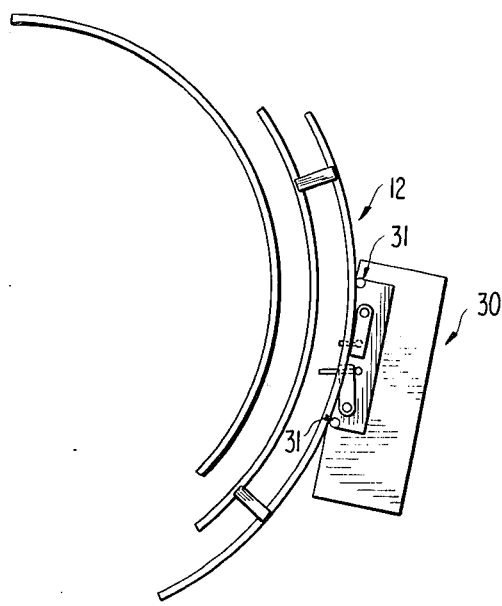
FIG. 3 is a side view of the tile-laying apparatus showing the mounting arrangement of the degapping apparatus.
Figure 4:
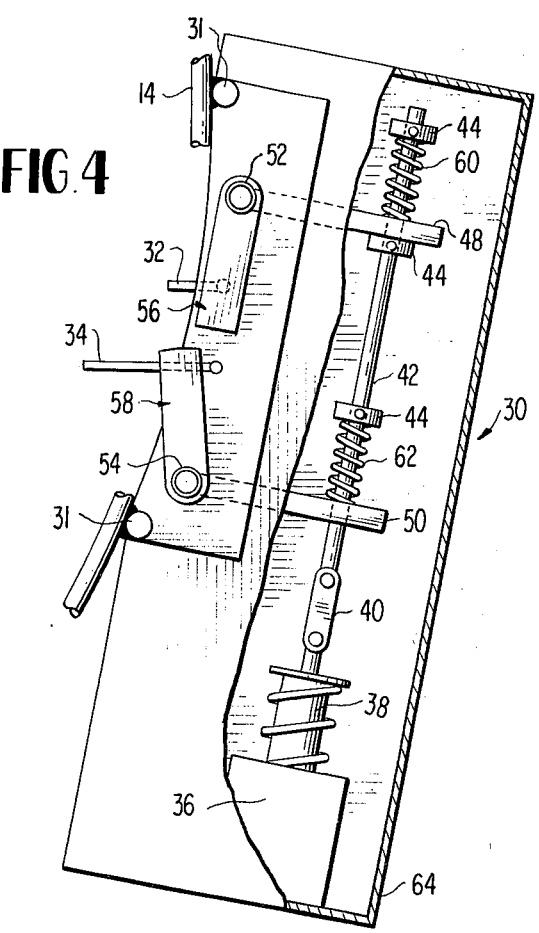
FIG. 4 is a side view, partially in section, of the degapping apparatus as shown in FIG. 3.

FIG. 3 illustrates the mounting and operational relationship of the tile degapper 30 on the dispensing chute 12 by welding cross bars 31 on the chute rails 14. FIG. 4 is a cutaway view of the degapper 30 showing the misalignment switch lever 32 and the gap switch lever 34. Solenoid coil 36 operates in conjunction with the solenoid slug 38 with flexible link 40 connected between the slug 38 and rod 42. When the solenoid coil 36 is energized, the slug 38 is drawn into the coil pulling down on rod 42 through the flexible link 40. Rod 42 has three stops 44 with arms 48 and 50 positioned therebetween as shown. Arms 48 and 50 are rigidly connected through pivot points 52 and 54 to repositioning arm 56 and detaining arm 58, respectively. Arms 48 and 50 are biased towards the lower stops 44 by springs 60 and 62, respectively. It can be seen that if the coil is energized and the rod 42 moves downward, detaining arm 58 will rotate about pivot point 54 and move in towards the rod whereas repositioning arm 56 will move outward away from the rod 42. The solenoid and internal rod and arms are sealed in a dustproof, waterproof housing 64 to prevent premature deterioration of the mechanical and electrical parts. In this view, a stretch spring connected between arms 48 and 50 has been excluded for clarity of understanding.

Figure 5:
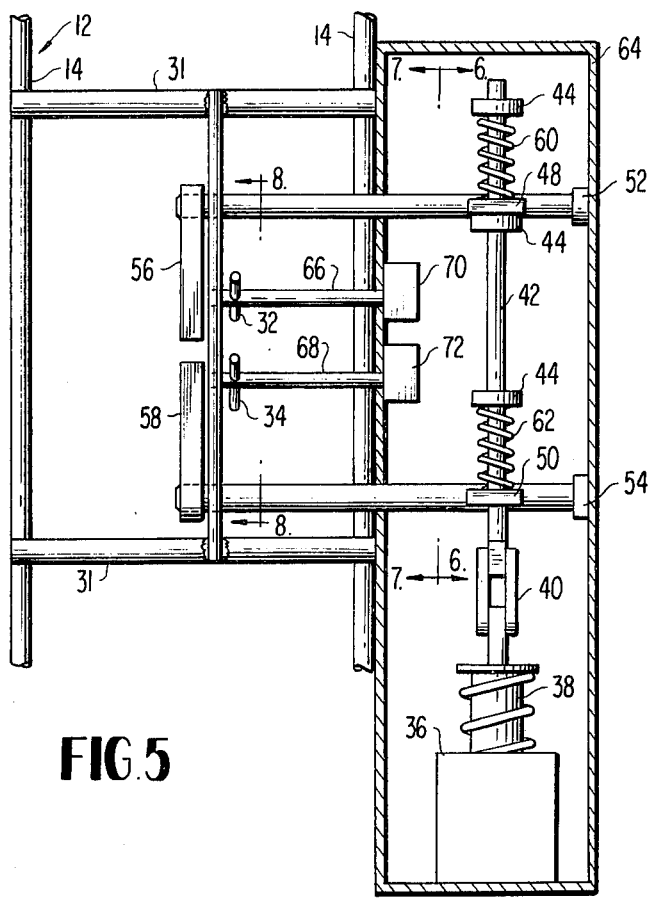
FIG. 5 is a cross-sectional front view of the degapping apparatus.

FIG. 5 shows the pivot points 52 and 54 from which arms 48 and 50, and 56 and 58 protrude, respectively. Misalignment switch lever 32 and gap switchlever 34 are connected to switches 70 and 72, respectively, through pivots 66 and 68. Springs and stops (not shown) bias these levers in the position shown such that switches 70 and 72 are normally in the off and on positions, respectively. The degapper apparatus and housing are mounted on chute rails 14 such that repositioning and detaining arms 56 and 58 respectively are essentially in the center of the pathway of the clay tiles as they move down the chute 12.

Figure 6:
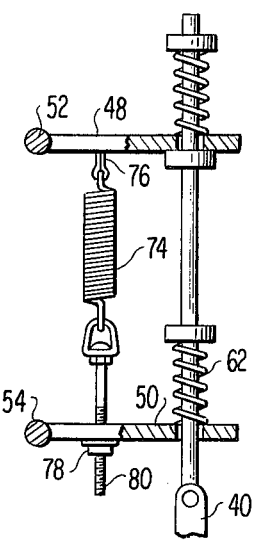
FIG. 6 is a side view, partially in section, of the stretch spring of FIG. 5 along the section lines 6—6.

FIG. 6 is a view of FIG. 5 along section lines 6—6 showing the details of stretch spring 74, attachment point 76 and adjustment bolt 78. Stretch spring 74 is tensioned between arms 48 and 50 such that it retains arm 50 against spring 62. This stretch spring is necessary to allow detaining arm 58 (more clearly seen in FIG. 5) to be deflected inward by the side of a correctly aligned tile as it passes along the distribution chute while positioning the arm to engage misaligned tiles. The tension of spring 74 is adjusted by tightening or loosening nut 78 on threaded shaft 80.

Figure 7:
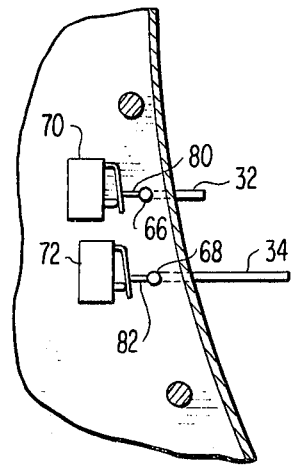
FIG. 7 is a section view along the lines 7—7 of FIG. 5 showing the sensing switch arrangement.
Figure 8:
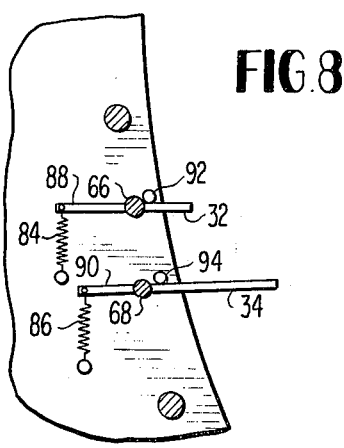
FIG. 8 is a section view along the lines 8—8 in FIG. 5 showing the spring return of the sensing switch levers.

FIGS. 7 and 8 along section lines 7—7 and 8—8, respectively, show the details of the location and operation of switches 70 and 72. FIG. 7 shows the tabs 80 and 82 which strike microswitches 70 and 72, respectively, to maintain switch 70 in an OFF position and switch 72 in an ON position as shown. FIG. 8 shows the details of the switch lever biasing springs 84 and 86 which pull down on lever extensions 88 and 90 thus biasing misalignment switch lever 32 and gap switch lever 34 against stops 92 and 94, respectively.

FIG. 9 illustrates the electromechanical relationship of the switch levers 32 and 34 to the solenoid coil 36. Actuation relay 96 is electrically connected in series with switches 70 and 72 and power supply 98 such as when both switches 70 and 72 are closed, power is supplied through relay coil 100 causing contacts 102 to supply current through solenoid coil 36. As shown in FIG. 4, energizing coil 36 pulls slug 38 downward causing repositioning arm 56 to move outward and detaining arm 58 to move inward, thus repositioning a misaligned tile.

FIGS. 10A, B, C, D and E show how a misaligned tile moving down the distribution chute is repositioned into correct alignment. Misaligned tile 20 has forward end 104 lapped under rear end 106 of the preceding tile 10. As shown in FIG. 10A, the passage of tile 10 causes gap switch lever 34 to be depressed thus opening switch 72 while misalignment switch lever 32 is undepressed thus maintaining switch 70 in an open condition also. As the misaligned tile 20 moves down the distribution chute it depresses misalignment switch lever 32 turning on switch 70. However, because gap switch lever 34 is still depressed the gap switch 72 is still turned OFF precluding operation of the solenoid actuation relay 96. In FIG. 10C, the misaligned tile 20 has progressed far enough down the distribution chute 12 to catch on detaining arm 58. Switches 70 and 72 are in the same condition as in 10B thus precluding solenoid actuation. However, in FIG. 10D, aligned tile 10 has continued moving down the distribution chute 12 allowing switch 34 to move towards the ON position. Misaligned tile 20 is still detained by detaining arm 34 and continues to actuate switch 70 in the ON position by depressing misalignment switch lever 32. When gap switch lever 34 has moved under the influence of spring 86 (as more clearly seen in FIG. 8), the switch 72 is also closed causing the actuation relay to be energized. This causes energization of the solenoid coil with the resultant clockwise movement of arms 56 and 58 rotate from the dotted line position to the solid line position. Misaligned tile 20 (shown in its previous position) is bumped toward the position of tile 20' in the solid black line by lever 56. Detaining lever 58 is simultaneously withdrawn allowing the repositioned tile 20' to fall into a correct alignment, that is where forward end 104 laps over rear end 106 of the previous tile 10. The use of springs 60 and 62 tend to cushion the potentially violent action of the solenoid such that the movement of arms 56 and 58 do not damage the clay tiles. Similarly the distance that repositioned tile 20' falls is not sufficient to cause damage to itself or the previous tile 10.

Figure 11:
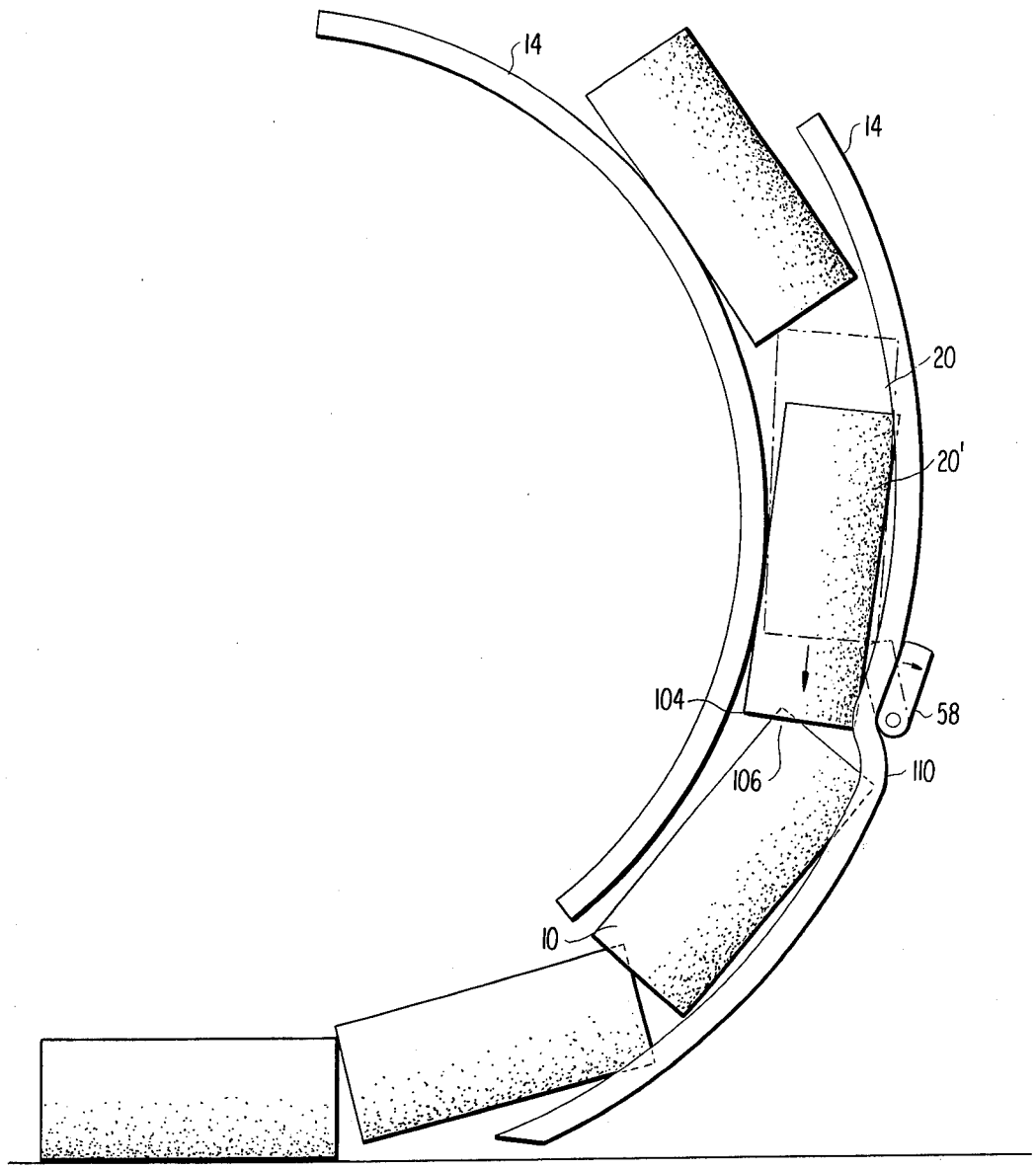
FIG. 11 is a side view of a further embodiment of the instant invention.

FIG. 11 discloses a further embodiment of the degapping apparatus in which the repositioning arm 56, shown in FIGS. 1–10, has been eliminated. As in previous embodiments, a misaligned tile 20 is retained on arm 58 when in the dotted line position. When both switches (not shown) are closed, the energization of the solenoid coil forces arm 58 to move in a clockwise direction releasing tile 20. The tile then drops over the previous tile 10 such that leading edge 104 laps over the trailing edge 106 of the preceding tile. The use of deformation 110 in the rear chute rail 14 allows the rear end of the preceding tile to fall immediately under the misaligned tile such that when it is released by the detaining arm 58 the misaligned tile drops into correct position. A similar switch and solenoid arrangement as in FIGS. 1–10 can also be employed in the embodiment in FIG. 11. This embodiment has the advantage of reducing the number of arms that the solenoid is required to move thus reducing the power drain and complexity of the apparatus. However, it requires the rear rail of the tile-laying chute to be deformed to allow the trailing edge of the previous tile to fall directly under the center of the detained tile 20. This deformed chute rail is not as easily retrofitted into the current tile-laying machinery although it could be readily incorporated in the design of new equipment.

Clearly, those skilled in the art could devise modifications and varying equipment to accomplish the same results in view of the above teachings. Obviously, numerous modifications and variations of the present invention are possible in light of the above teachings. It is therefore to be understood that within the scope of the appended claims, the invention may be practiced otherwise than as specifically described therein.

What is claimed is:

1. An apparatus for detecting and correcting misaligned tiles in an automated tile laying system wherein tiles, having a cylindrical shape, open at both ends, are fed into a semicircular distribution chute in the vertical plane such that the tiles progress around and down the chute, the front edge of each tile is lapped over the rear edge of a preceding tile when in proper alignment, and no gaps occur between the tiles being placed on the ground, and when improperly aligned the front edge of a tile is lapped under the rear edge of a preceding tile causing the front edge of the tile to strike the ground a distance away from the rear of the preceding tile causing a gap in the line of tiles, said apparatus comprising:

sensing means for detecting said misaligned tile in the chute;

delaying means responsive to said sensing means for momentarily stopping the misaligned tile from progressing further down the distribution chute; and readjustment means for positioning the misaligned tile such that when released by said delaying means said tile drops to the preceding tile with its forward edge lapped over the rear edge of the preceding tile as it is deposited on the ground.

2. The apparatus of claim 1 wherein said sensing means is comprised of:

first switch means for sensing the presence of said misaligned tile as it travels down the chute and for providing an output indicating said sensing; and second switch means for sensing passage of said tile preceding the misaligned tile and for providing an output indicating said sensing.

3. The apparatus of claim 2 wherein said delaying means is comprised of:

a first arm having a projecting portion which extends into the distribution chute, in a detaining position such that properly aligned tiles pass undisturbed, but misaligned tiles are detained on said projecting portion of said arm; and withdrawl means for removing said first arm from said detaining position in response to said outputs of said first and second switch means.

4. The apparatus of claim 3 wherein said withdrawal means comprises:

power means, responsive to said first and second switch means, for providing an electrical current; and solenoid means, responsive to said power means, for providing a mechanical motion to said first arm causing said misaligned tile to be released.

5. The apparatus of claim 4 wherein said readjustment means is a second arm responsive to said solenoid means, for projecting said misaligned tile substantially sideways into said properly aligned position.

6. The apparatus of claim 4 wherein said readjustment means is comprised of a deformation means in the rear of the distribution chute immediately below said delaying means, for allowing the rear edge of said preceding tile to be positioned under the front edge of said misaligned tile.

* * * * *